US 6,777,063 B2

(12) United States Patent
Born

(10) Patent No.: US 6,777,063 B2
(45) Date of Patent: Aug. 17, 2004

(54) COMPOSITE BACKERBOARD FOR BULLNOSE SUPPORT

(75) Inventor: David W. Born, Midlnad, MI (US)

(73) Assignee: Dow Global Technologies Inc., Midland, MI (US)

( * ) Notice: Subject to any disclaimer, the term of this patent is extended or adjusted under 35 U.S.C. 154(b) by 34 days.

(21) Appl. No.: 10/247,070

(22) Filed: Sep. 18, 2002

(65) Prior Publication Data

US 2003/0021957 A1 Jan. 30, 2003

Related U.S. Application Data

(63) Continuation-in-part of application No. 09/755,759, filed on Jan. 5, 2001, now abandoned.
(60) Provisional application No. 60/176,357, filed on Jan. 14, 2000.

(51) Int. Cl.⁷ .............................. B32B 3/00; E04C 1/00
(52) U.S. Cl. ..................... 428/167; 428/172; 52/309.8; 52/309.12; 52/309.17
(58) Field of Search ................................. 428/150, 167, 428/172, 121, 130, 504.4, 318.4; 52/369.4, 309.7, 309.12, 309.16, 309.17, 309.8

(56) References Cited

U.S. PATENT DOCUMENTS

| 3,425,889 A | | 2/1969 | Willits, Jr. |
| 3,654,053 A | * | 4/1972 | Toedter ........................ 428/56 |
| 3,969,868 A | * | 7/1976 | Bainter et al. .............. 428/201 |
| 5,350,544 A | | 9/1994 | Bambara et al. |
| 5,961,900 A | | 10/1999 | Wedi |
| 5,972,259 A | * | 10/1999 | Hettinga ..................... 264/45.5 |

FOREIGN PATENT DOCUMENTS

| EP | 0 595 287 A1 | 5/1994 |
| WO | WO 97/44541 | 11/1997 |

OTHER PUBLICATIONS

Setting Tile, Michael Byrne, Tauton Books and Videos, pp. 173–219, 1995.

* cited by examiner

Primary Examiner—Donald J. Loney
(74) Attorney, Agent, or Firm—Steven W. Mork

(57) ABSTRACT

Backerboards comprising a shaped cut or groove the allows bending of the backerboard into an L-shaped corner with a rounded outer surface and sharp inner surface are useful for supporting bullnose tile pieces.

10 Claims, 2 Drawing Sheets

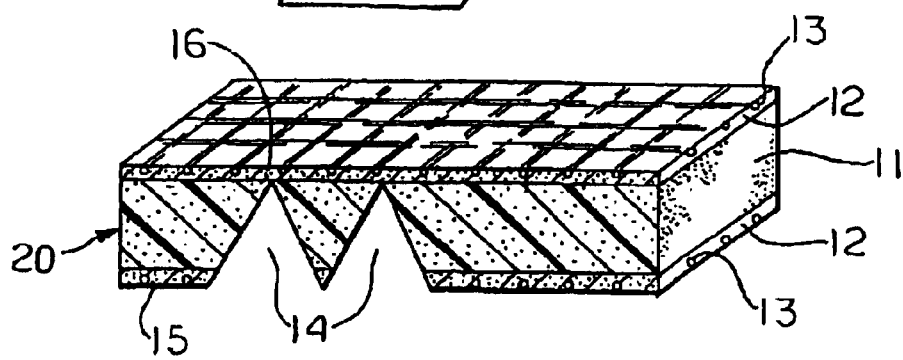
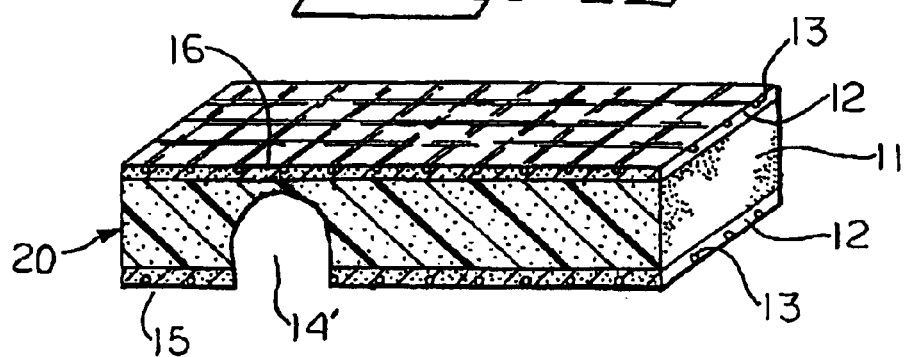
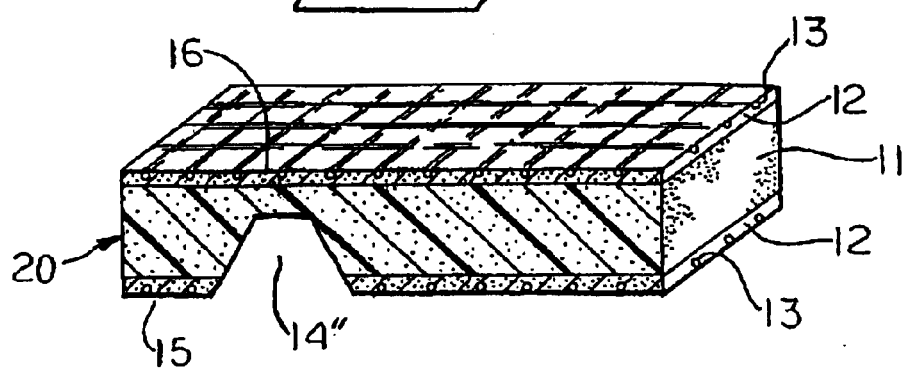

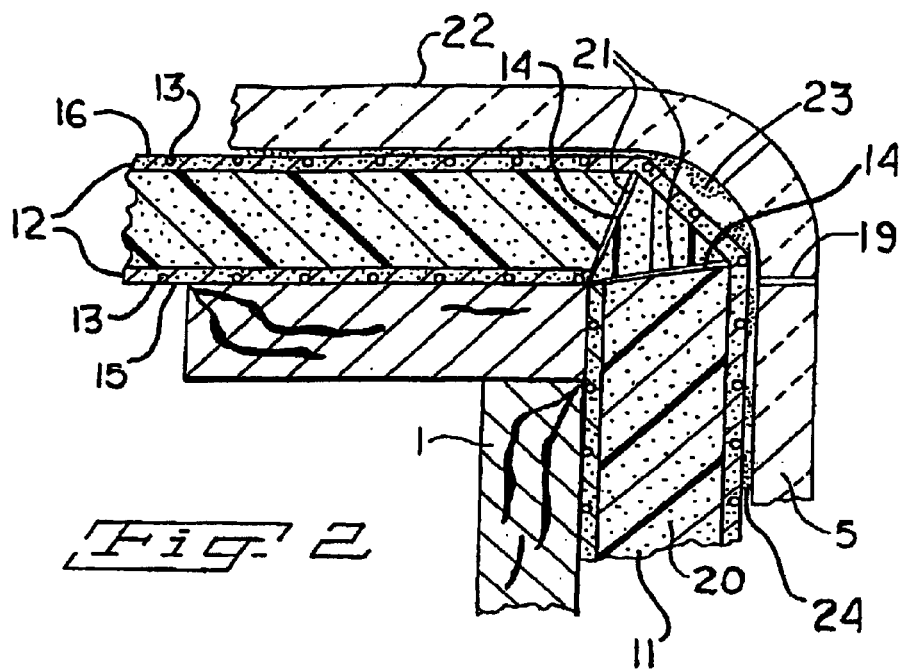
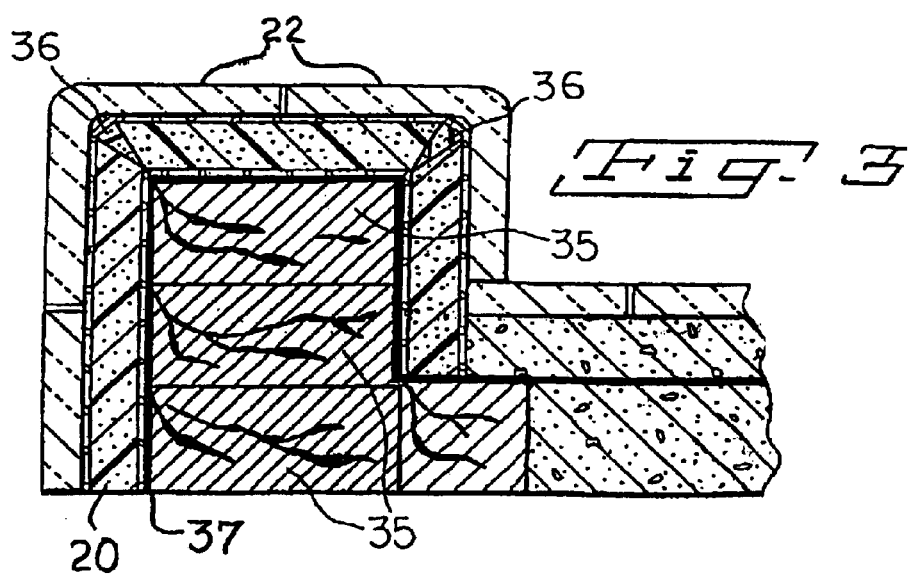

COMPOSITE BACKERBOARD FOR BULLNOSE SUPPORT

CROSS REFERENCE

This is a continuation-in-part of application Ser. No. 09/755,759, filed Jan. 5, 2001 now abandoned; which is a continuation-in-part of Application No. 60/176,357, filed 14 Jan. 2000.

BACKGROUND OF THE INVENTION

1. Field of the Invention

The present invention relates to backerboard that is particularly well suited for use with bullnose tile pieces.

2. Description of Related Art

Backerboard is a composite sheet of a core material with a bonding coating on at least one surface that provides a bonding surface for attaching finishing products or adhesives. U.S. Pat. No. 5,961,900 and U.S. Pat. No. 5,350,544 both describe backerboards and methods of their manufacture.

A major use of backerboards is in combination with tile installation. Backerboards provide a smooth surface for applying tile. Certain backerboards, such as those with a foam core, can also provide thermal and acoustical insulation through a tiled substrate. Installation of backerboard and tile currently can be a laborious and time consuming effort, especially when installing over or into various corners, curbs and wall inserts. A major contributing factor to the labor time is installation of backerboard into corners, curbs and wall inserts.

Current process for forming corners with backerboard produce sharp outside corners, which are not particularly well suited for overlaying with bullnose tiles. Bullnose tile pieces have a curved profile to soften a corner's radius of curvature. Applying a bullnose tile over a sharp corner can be challenging. If backerboard is present over the entire corner by, for example, butting backerboard pieces to one another then the corner projects a bullnose tile off from the adjoining surfaces of backerboard. As an alternative, installers typically apply backerboard only to the adjoining surfaces without extending over the edge itself. As a result, a gap is present along corner edge, under the curved corner of the bullnose tile. This gap is often filled with adhesive, but can provide a means of water leakage through to a substrate behind the backerboard.

A backerboard that can bend into corner and curb shapes while maintaining a curved outer profile to support bullnose tiles is desirable, particularly if the backerboard remains intact around the corner in order to provide a water barrier.

BRIEF SUMMARY OF THE INVENTION

The present invention is a backerboard comprising opposing surfaces, a bonding coating on at least one surface, and at least one shaped cut or groove that penetrates through and traverses a surface opposing a surface containing a bonding coating but does not penetrate through the bonding coating on the opposing surface; wherein said backerboard can bend along said shaped cut or groove to form an L-shaped corner having a rounded outer edge and a sharp inner edge.

The present invention addresses a need in the art by providing a backerboard that can bend into corner and curb shapes while maintaining a curved outer profile to support bullnose tiles.

BRIEF DESCRIPTION OF THE DRAWINGS

FIGS. 1A, 1B, and 1C illustrate three different shaped grooves in a backerboard.

FIG. 2 illustrates a backerboard similar to that of 1A that is bent into a corner configuration.

FIG. 3 illustrates a backerboard of the present invention in a curb installation.

DETAILED DESCRIPTION OF THE INVENTION

This invention relates to backerboards."Backerboard", "composite backerboard", and "composite board" are equivalent and all refer to one or another of the various composite boards useful in the practice of this invention. Backerboards comprise a core that has a bonding coating on at least one surface that is suitable for attaching finishing products or adhesives.

The core can be expanded thermoset or thermoplastic beadboards or extruded foam or fibers, beads, flakes, strips, fragments of organic or inorganic material or both, or a combination thereof. Preferably, the core is a polystyrene foam such as STYROFOAM® extruded polystyrene insulation (STYROFOAM is a trademark of The Dow Chemical Company). Preparing a core by compacting a layer of beads, chips, flakes, fragments, or combinations thereof of organic or inorganic materials is also suitable. Combinations of layers of beads, chips, flakes, and fragments of organic or inorganic materials can be coated with an expanded extrudate. A core can comprise such combinations sandwiching or being sandwiched by an expanded extrudate. Sandwich structures can produce cores having particularly desirable mechanical strength. Expanded extrudate includes polystyrene or glass and expanded polyurethane and polyisocyanurate foam materials.

The thickness of the core is relatively uncritical. In general the core is between 0.3 and ten centimeters thick. For example, some applications can benefit from a core thickness in a range of from 0.3 to 3 cm thick, others from 2 to 10 cm thick, depending on their purpose.

Bonding coatings are on at least one surface of the core (front surface) and provide a bonding surface for attaching finishing products or adhesives. Bonding coatings can also go on a surface opposite to the front surface, which is the back surface. Bonding coatings useful for use in the present invention include traditional mortars, including various mixtures of cement, Portland cement, magnesia cement, alumina cement, line, and gypsum with sand and water. Suitable bonding coatings also include various plastic materials including thermosets such as rigid polyurethanes, and thermoplastics such as engineering thermoplastics. The thickness of the bonding coating is desirably thin, as thin as 0.2 mm for example. There is essentially no upper limit for the thickness of the bonding coating, but desirably it is one cm or less, preferably 2 mm or less. Bonding coatings generally are on either one surface or two opposing surfaces of a core.

Desirably, the bonding coating further includes a reinforcing component. Reinforcing components tend to be flexible and serve to increase tensile strength to the bonding coating, and backerboard, during fabrication and use. Materials useful as the reinforcement layer include woven and nonwoven glass cloth or fiber, aramid or polyester fabric or fiber, polyvinylchloride coated glass fiber yarns, metal gauze including copper, aluminum and stainless steel, and thermoplastic and thermoset plastic materials such as polyolefins, nylon, polyvinylidene chloride in the form of woven or nonwoven cloth, fabric or fiber. Fiberglass mesh is one particularly attractive reinforcing material due to its strength, flexibility, and availability. Reinforcing components typically reside within a bonding coating Backerboards of the present invention have opposing outer and inner surfaces. Generally, tiles go over the outer surface and the inner surface is proximate to a support, such as a wooden frame. An "outer edge" corresponds the outer surface. An "inner edge" corresponds to the inner surface opposite the outer surface. The inner surface is typically proximate to a support substrate such as a wooden frame.

The present invention advances backerboard technology by providing backerboards having shaped cuts or grooves that allow the backerboard to bend to form an L-shaped corner having a rounded outer surface (or edge when viewing a profile or the corner) without fracturing the bonding coating on the outer surface. Desirably, upon bending, the backerboard has an essentially sharp inner edge. An L-shaped corner desirably contains a bend ranging anywhere from 75 to 105 degrees, preferably anywhere from 85 to 95 degrees, most preferably the bend is a 90-degree angle bend.

The resulting rounded outer surface allows a piece of bullnose tile to fit round the outer surface corner and provides support behind the bullnose tile. The continuous bonding coating on the outer surface of the backerboard also provides a water barrier that is superior to configurations that provide a discontinuity in bonding coating, either by fracturing the bonding coating or by utilizing discontinuous pieces of backerboard. A sharp inner edge allows a snug fit to a support framework, such as a wooden board.

A "rounded" edge refers to an edge have a radius of curvature, or virtual radius of curvature, of at least 3 mm, preferably at least 5 mm, more preferably at least 7 mm. Generally, though not necessarily, a rounded edge has a radius of curvature of less than 2 cm.

A rounded edge can have a curved profile or a facetted profile. Curved profiles have a radius of curvature and facetted profiles have a virtual radius of curvature. A "virtual radius of curvature" is a radius for a curve that is projected over a corner that is not perfectly round, but rather comprises one or more facets and more than one vertex, or inflection point, on an edge's profile. The curve projected over a corner is an arc of a circle that intersects the vertices, or inflection points, of a corner's profile. Curved profiles are desirable because they can fit more closely to a bullnose tile piece, resulting in less space or gap between a backerboard and bullnose tile piece and better support for the bullnose tile piece.

A "sharp" edge refers to an edge have a radius of curvature, or virtual radius of curvature, of less than 3 mm, preferably less than 2 mm, more preferably less than 1 mm.

Backerboard of the present invention comprise shaped cuts or grooves that traverse a surface of the backerboard and that penetrate through one surface of the backerboard to a depth sufficient to allow bending of the backerboard without fracturing the bonding coating on an opposing second surface of the backerboard. Cuts or grooves can penetrate partially or entirely through a backerboard's core. Cuts and grooves do not cut entirely through, and preferably do not cut into, the bonding coating on the outer surface of the backerboard. Preferably, cuts and grooves to not cut through any reinforcing material in the bonding coating on the outer surface.

Desirably, shaped cuts or grooves are wider near the inner surface of the backerboard than near the outer surface. FIGS. 1A, 1B, and 1C show backerboards with examples of suitable shapes for grooves. Each of FIGS. 1A, 1B, and 1C shows backerboard 20 comprising core 11, bonding coating 12 on both surfaces of backerboard 20, reinforcing materials 13 in the coatings. Surface 15 of the backerboard is the inner surface while surface 16 is the outer surface. FIG. 1A shows groove 14 comprising two adjoining V-grooves (i.e. a W-groove). FIG. 1B shows groove 14', a rounded groove. Rounded grooves can be a bullnose groove or partial circle groove. FIG. 1C shows groove 14", a trapezoidal groove. Variations of these grooves are also suitable including, for example, three or more adjoining V-grooves, a trapezoidal groove having a sawtooth bottom, a rounded groove having a saw-tooth bottom, a trapezoidal groove having a rounded bottom, and adjoining trapezoidal or rounded grooves. Two grooves are "adjoining" if their width along a backerboard surface (surface width) is wider than the space between them along the same surface. Measure both their surface width and space between them along the surface through which the groove penetrates. For example, a W-groove comprises two adjoining V-grooves that have no space between them. Conceivably, a shaped groove can be a rectangular or square groove. Desirably, the shaped cut or groove is other than a rectangular or square groove because such grooves tend to leave an undesirably large gap within the board when bent into a corner.

A skilled artisan recognizes that cuts such as single V-grooves are not suitable as shaped cuts or grooves for use in the present invention. A single V-groove is not suitable because bending a backerboard along a single V-groove tends to produce a sharp outer edge rather than a rounded outer corner. V-grooves have straight sides that meet directly at a single point. Trapezoidal grooves can also have straight sides but are distinct from V-grooves because the sides meet indirectly through a bottom width. That bottom width may be smooth or jagged and separates the two sides by a finite distance. Rounded grooves are distinct from V-grooves because they do not have straight sides, but rather curve towards each other at least near where they meet. Bending a backerboard along V-grooves tend to produce vertices on a resulting corner profile. Multiple adjoining V-grooves produce multiple vertices and one or more facets on a resulting corner profile. Bending a backerboard along a groove having a bottom width or rounded bottom tends to produce rounded profiles.

A skilled artisan also recognizes that multiple cuts or grooves that are not adjoining are not suitable for use in the present invention because they tend to produce rounded inner corners.

Form shaped cuts or grooves in a backerboard either during manufacturing of the backerboard or at any time after backerboard manufacture and prior to bending for installation. One suitable method of forming shaped cuts into a backerboard is by using a router with a bit of a shape complementary to a desirable shaped cut or groove. For example bullnose router bits and 22.5-degree angle V-bits, which produce a 45-degree angle V-groove, are suitable for forming rounded and V-grooves, respectively. Cutting two adjoining V-grooves with a 22.5-degree angle V-bit into a backerboard allows the backerboard to bend into a 90-degree corner along those two grooves. Milling the cuts or grooves is also acceptable. A knife is also suitable for cutting a groove into a backerboard. For example, a person installing backerboard can cut a groove into a backerboard using a utility knife to obtain a backerboard within the scope of the present invention.

Backerboards such as those available from wedi GmbH (wedi Building Board), Lux Elements GmbH & Co KG and other European companies are examples of backerboards suitable for modifying by routing, milling, or cutting shaped cuts or grooves to obtain backerboards of the present invention.

It is desirable to apply an adhesive to a shaped groove or cut of a backerboard when bending into a corner shape. The adhesive helps to hold the backerboard into a bent configuration and can support the corner by filling gaps and spaces. Apply adhesive to the groove or cut, preferably just prior to bending along the groove or cut. Suitable adhesives include a wide variety of commonly available glues, caulks, adhesives, bonds and sealants useful in construction. Desirably, the adhesive is water-resistant such as Chemcalk 915 from Bostik.

Adhere tiles to the outside surface of backerboards of the present invention using, for example, standard tile setting material common in the art.

The following examples further illustrate the present invention.

EXAMPLE (EX) 1

Cut a W-groove into a backerboard (e.g., wedi Building Board) using a router with a 22.5-degree angle V-bit by routing two adjoining V-grooves that traverse one surface of the backerboard to obtain backerboard 20 in FIG. 1A. Use backerboard 20 that has core 11 and bonding coating 12 and reinforcing material 13 on two opposing surfaces, 15 and 16. Route grooves 14 so that it extends through bonding coating 12 and reinforcing material 13 on surface 15 and core 11 without penetrating into bonding coating 12 or reinforcing material 13 on surface 16.

Bend backerboard 20 to form a corner configuration (see FIG. 2). Prior to bending backerboard 20, apply adhesive 21 to grooves 14. Apply backerboard 20 to support substrate 1 and cover the corner bullnose tile piece 22 and flat tile piece 5. Connect tile pieces 22 and 5 with grout 19. Setting material 24 typically resides between backerboard 20 and tiles 22 and 5, as well as fills gap 23.

Ex. 1 illustrates a backerboard of the present invention that has a W-groove and how to use the backerboard to form a corner including a bullnose tile. Expect similar results using a shaped groove comprising adjoining rounded or adjoining trapezoidal grooves. Adhesive 21 can fill any additional space in the groove that may result from using a different shape of groove.

EX. 2

Prepare a backerboard as in Ex.1 but with two sets of W-grooves spaced apart approximately 3.5 inches (8.89 cm).

See, for example, FIG. 3, which illustrates a backerboard having two corners, 36, covered with bullnose tile 22. Each corner, 36, is similar to the corner configuration of FIG. 2. Backerboard 20 conforms to a raised curb defined by 2×4 pieces of lumber, 35. A waterproofing membrane 37 resides between backerboard 20 and lumber 35.

What is claimed is:

1. A backerboard comprising opposing surfaces, a bonding coating on at least one surface, and at least one shaped cut or groove that penetrates through and traverses a surface opposing a surface containing a bonding coating but does not penetrate through the bonding coating on the opposing surface; wherein said backerboard can bend along said shaped cut or groove to form an L-shaped corner having a rounded outer edge and a sharp inner edge and wherein said shaped groove or cut comprises a shape selected from the group consisting of rounded grooves, trapezoidal grooves and adjoining grooves.

2. The backerboard of claim 1, wherein said bonding coating comprises a mortar or plastic material.

3. The backerboard of claim 1, wherein said bonding coating further comprises a reinforcing component.

4. The backerboard of claim 1, wherein both surfaces contain a bonding coating.

5. The backboard of claim 1, wherein both surfaces comprise a bonding coating comprising a mortar and a reinforcing component.

6. The backerboard of claim 1, wherein said backerboard comprises a core selected from a group consisting of expanded thermoset and thermoplastic beadboards, extruded foam and fibers, beads, flakes, strips, fragments of organic material, and fragments of inorganic material.

7. The backerboard of claim 1, wherein said backerboard comprises a core of extruded polymeric foam.

8. The backerboard of claim 1, wherein said backerboard comprises a core of extruded polystyrene foam.

9. The backerboard of claim 1, further comprising an adhesive in said shaped groove or cut wherein said backerboard is bent along said shaped groove to form and L-shaped corner having a rounded outside surface and a sharp inside surface.

10. The backerboard of claim 9, further comprising a bullnose piece of tile adhered to the outside surface over the L-shaped corner.

* * * * *